(No Model.) 2 Sheets—Sheet 1.

O. ANDERSON.
CENTRIFUGAL CREAMER.

No. 547,367. Patented Oct. 1, 1895.

WITNESSES: Robert Sollberger, Louisa Browne.

INVENTOR: Oscar Anderson, BY Drake & Co., ATT'YS.

(No Model.) 2 Sheets—Sheet 2.

O. ANDERSON.
CENTRIFUGAL CREAMER.

No. 547,367. Patented Oct. 1, 1895.

Fig. 6.ᵃ

WITNESSES: INVENTOR:
Robert Sollberger Oscar Anderson,
Louisa Browne BY Drake & Co. ATTY'S.

United States Patent Office.

OSCAR ANDERSON, OF NEWARK, NEW JERSEY.

CENTRIFUGAL CREAMER.

SPECIFICATION forming part of Letters Patent No. 547,367, dated October 1, 1895.

Application filed June 16, 1894. Serial No. 514,718. (No model.)

*To all whom it may concern:*

Be it known that I, OSCAR ANDERSON, a citizen of the United States, residing at Newark, in the county of Essex and State of New Jersey, have invented certain new and useful Improvements in Centrifugal Creamers; and I do hereby declare the following to be a full, clear, and exact description of the invention, such as will enable others skilled in the art to which it appertains to make and use the same, reference being had to the accompanying drawings, and to letters and numerals of reference marked thereon, which form a part of this specification.

The objects of this invention are to secure an increased output of cream from a given quantity of milk, to increase the capacity of the machine whereby a bowl of a given size will act on a larger quantity of milk per hour, to reduce the power necessary in operating the machine, to simplify and reduce the cost of construction, to render the cleaning operations more easy and quick, and to secure other advantages and results, some of which will be referred to in connection with the description of the working parts.

The invention consists in the improved centrifugal creamer and in the arrangements and combination of parts of the same, all substantially as will be hereinafter set forth, and finally embraced in the clauses of the claim.

Figures 1, 2, 3, 4, 5, 6:
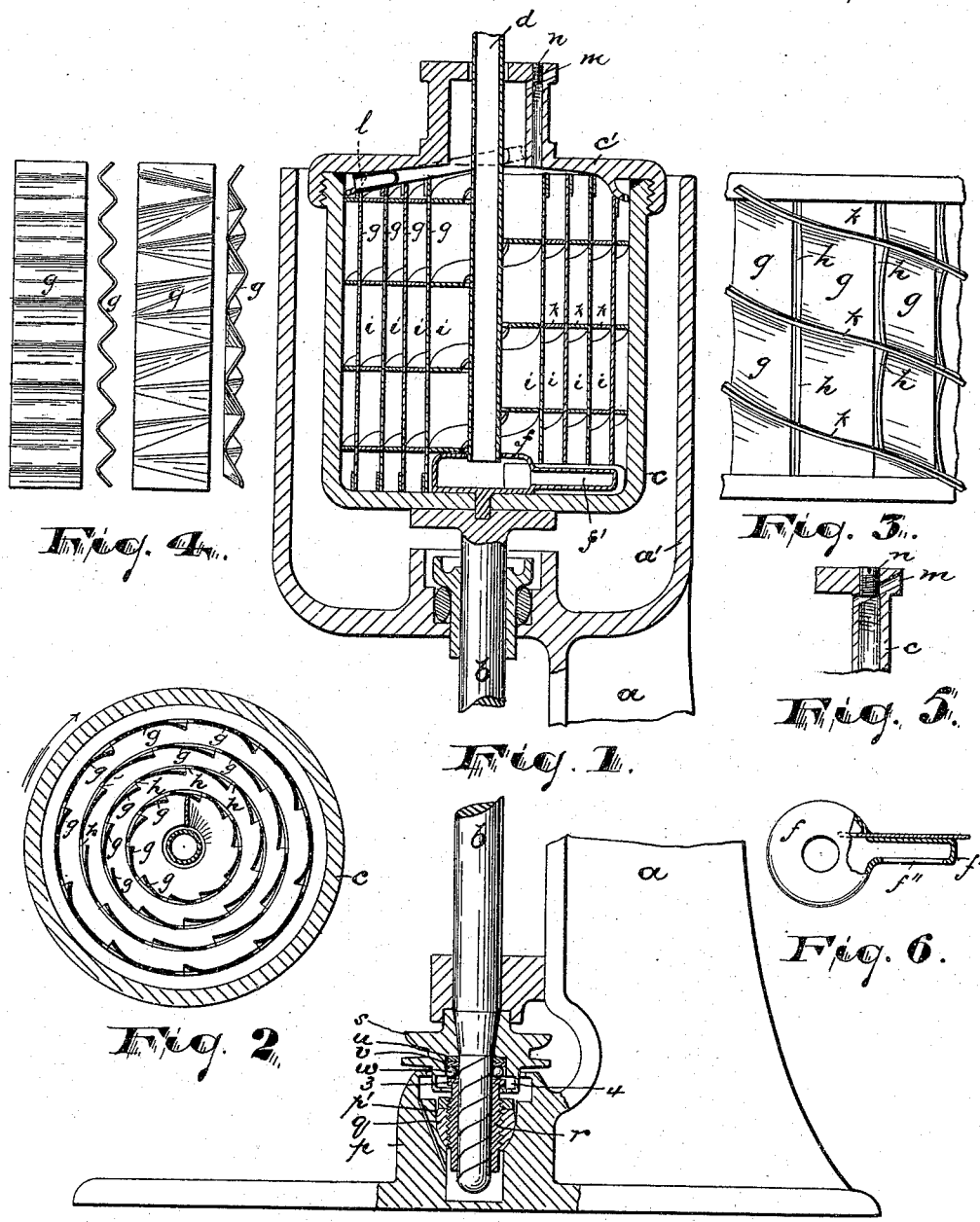
Figure 7:
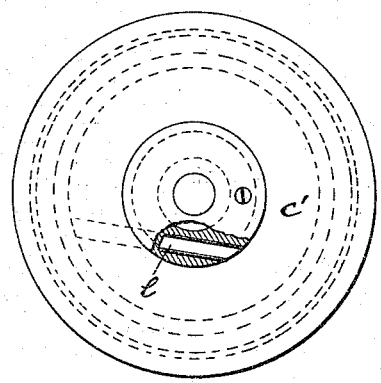
Figure 7:
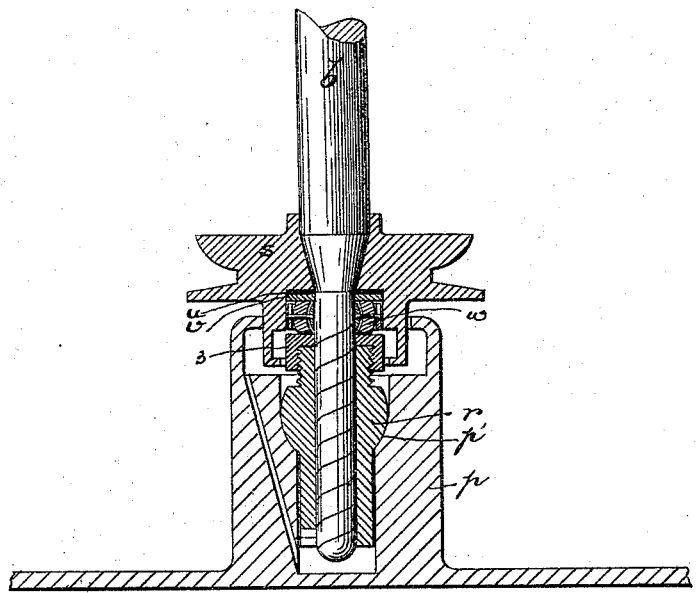

Referring to the accompanying drawings, in which like letters and numerals indicate corresponding parts in each of the several views, Figure 1 is a central vertical section of the machine, the center parts being broken away. Fig. 2 is a horizontal section of the bowl, showing the relations of the internal parts more clearly. Fig. 3 is a detail elevation of a portion of one of the annular or cylindrical creaming-frames. Fig. 4 presents detail face and edge views showing modified constructions of certain vertical plates of said frames. Fig. 5 is an enlarged detail showing the construction and arrangement of a regulating-screw, and Fig. 6 is a detail plan showing a certain milk-receptacle. Fig $6^a$ is a plan of the bowl, partly broken away, to show a blue-milk exit; and Fig. 7 is a section showing a detail construction sometimes preferred.

In said drawings, $a$ indicates the frame or bed of the machine, providing at the bottom bearings for the vertical shaft $b$ and at the upper part other bearings for said shaft and a receptacle $a'$ for the creaming-bowl $c$. The said bowl is seated on the upper end of said shaft in any ordinary manner and is provided with a cover $c'$, which is centrally open to allow the introduction of a feed-pipe $d$. The said feed-pipe extends down from a suitable reservoir (not shown) through said opening to the bottom of the bowl, where, at the axial center of said bowl, it enters a milk chamber or receptacle $f$, having an arm or extension $f'$ at one side, which is open at one of its sides, as at $f''$, Fig. 6, to allow an outflow of said milk to the separating-chambers.

The body of the bowl contains a series of concentric frames, comprising vertical plates $g\ g\ g$, arranged in annular series, approximately edge to edge with openings $h\ h\ h$, Figs. 2 and 3, between, which allow an interflow from the outer to the inner chambers of the concentric series $i\ i\ i$, and vice versa.

The plates at their forward vertical edges are bent inward from the true concentric circles of the annular series, as shown in Fig. 2, so as to lead the cream inward through the openings as the frames revolve. On the outer sides of the frames the plates are bound together by spiral partitions $k\ k\ k$, which coincide, so that there will be a continuous partition from the inner frame to the outer wall of the separating-chamber and that there will be a solid support for the plates and no opportunity for the fluid to pass from one side of the spiral partition to the other, but the said fluid will be compelled to take a spiral course continuously from the bottom to the top of the bowl.

At the upper part of the bowl, near the periphery and at the termination of the outer spiral chamber, is a skim-milk exit $l$, and at the center of the cover is a cream-exit $m$, at which is a regulating-screw $n$, the said screw being arranged vertically in said bowl and the cream-passage disposed at an inclination thereto, so that the outflow of cream can be regulated with greater nicety. The skim or blue milk exit $l$ extends from near the periphery of the bowl $l$ inward and upward through the cover and in a direction counter to the movement of the bowl on its axis, so that the fluid in issuing through the bowl will impart some of its momentum to said bowl and thus reduce the power necessary in keeping the bowl in operation. The plates instead of being plain, as shown in Fig. 3, may be horizontally corrugated, as shown in Fig. 4, thus presenting an increased creaming-surface to the fluid.

At the lower end of the machine the bearing preferred for the rotary shaft $b$ is shown in Fig. 1, where the bed-plate is provided with a cup-shaped receptacle $p$, which is provided with a ball-socket $p'$ at the upper part or above the oil-chamber, into which is arranged a ring-shaped ball-bearing $q$. This is interiorly threaded and receives a collar $r$ for the lower end of the shaft. The said lower end of the shaft is provided with a spiral oil-groove by which oil is raised from the receptacle to certain bearings above said collar. On said shaft is arranged a pulley $s$, grooved to receive a belt, said pulley being fixed to the shaft by means of a conical shoulder $t$, driven into a correspondingly-shaped center opening of the pulley or otherwise. On the under side the pulley $s$ is recessed, and in the recess is arranged first an elastic washer $u$, serving as a bearing for balls $w$, which latter take the weight of the bowl. The balls $w$ rest on a washer 3 at the upper end of the collar. A receptacle 4 for metallic particles is formed at the bottom of the pulley below the recess for the washers.

In operating the device the milk is fed to the machine through the tube $d$ and is thereby led into the receptacle $f$. From thence it issues into the chambers $i\ i\ i$ and is given an upward course by means of the spiral partitions, the milk being given a speed greater than that of the bowl. The action of centrifugal force serves to throw the heavier blue milk outward, while the fatty particles move toward the center of the bowl, and following the inwardly-bent cream-gathering plates the cream flows through the openings $h$ inward, while the blue milk passes outward through the same. By the time the fluid arrives at the upper end of the bowl, after making two or three circuits of the same, the lighter parts are thoroughly separated from the heavier and the latter pass outward through the exit-tube, giving up to said bowl some of its power of movement, while the cream near the axis of the bowl flows out through the cream-opening $m$. The arrangement of the bearings for the shaft allows an automatic adjustment of parts, so that there will be no binding.

Having thus described the invention, what I claim as new is—

1. The combination with the rotary bowl, of plates arranged in circles concentric with the bowl and curved inward or having the concavities on the sides toward the center of the bowl, and spirals formed at the sides of said plates to give an upward flow through the chamber between said circles of plates, substantially as set forth.

2. In a centrifugal creamer, the combination with the rotary bowl, of curved plates arranged vertically in annular series within said bowl with openings between to allow an inflow of cream and an outflow of blue milk therethrough, and spiral partitions joining the plates of a series and giving upward movement to the separating fluids, substantially as set forth.

3. In a centrifugal creamer, the combination with the rotary bowl, of vertical plates with openings between and spiral partitions at the sides for giving a vertical movement to the fluids, substantially as set forth.

4. In a centrifugal creamer, the combination with the bowl of a series of annular frames consisting of vertical plates and spiral partitions, wound around said plates and fastened thereto, said frames being separable from one another and being nested one within another to form a series of annular chambers, substantially as set forth.

5. In a centrifugal creamer, the combination with a bowl, of a frame comprising vertically separate plates and spiral binding ribs extending around the outside of said plates and serving to give a movement to the fluid lengthwise of said plates, substantially as set forth.

In testimony that I claim the foregoing I have hereunto set my hand this 12th day of June, 1894.

OSCAR ANDERSON.

Witnesses:
CHARLES H. PELL,
LOUISA BROWNE.